(12) United States Patent
Mao et al.

(10) Patent No.: US 12,098,627 B2
(45) Date of Patent: Sep. 24, 2024

(54) TURBINE FRACTURING SYSTEM, CONTROLLING METHOD THEREOF, CONTROLLING APPARATUS AND STORAGE MEDIUM

(71) Applicant: YANTAI JEREH PETROLEUM EQUIPMENT & TECHNOLOGIES CO., LTD., Shandong (CN)

(72) Inventors: Zhuqing Mao, Shandong (CN); Rikui Zhang, Shandong (CN); Peng Zhang, Shandong (CN); Jianwei Wang, Shandong (CN); Jihua Wang, Shandong (CN); Xiaolei Ji, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

(21) Appl. No.: 18/352,010

(22) Filed: Jul. 13, 2023

(65) Prior Publication Data
US 2023/0358126 A1 Nov. 9, 2023

Related U.S. Application Data

(63) Continuation of application No. 17/384,247, filed on Jul. 23, 2021, now Pat. No. 11,702,917.

(30) Foreign Application Priority Data
Jun. 2, 2021 (CN) .......................... 202110612965.6

(51) Int. Cl.
E21B 43/26 (2006.01)
F01D 15/08 (2006.01)
(Continued)

(52) U.S. Cl.
CPC .......... *E21B 43/2607* (2020.05); *F01D 15/08* (2013.01); *F02C 9/26* (2013.01);
(Continued)

(58) Field of Classification Search
CPC ........ E21B 43/2607; F01D 15/08; F02C 9/26; F02D 19/0647; F02D 41/0027;
(Continued)

(56) References Cited

U.S. PATENT DOCUMENTS 9,371,789 B2 6/2016 Rosswurm et al.
10,815,764 B1 * 10/2020 Yeung ................... F04B 49/007
(Continued)

FOREIGN PATENT DOCUMENTS

| CN | 101900033 A | 12/2010 |
| CN | 207867315 U | 9/2018 |

OTHER PUBLICATIONS

U.S. Appl. No. 10/815,764 B1, filed Oct. 2020, Yeung.

*Primary Examiner* — Jacob M Amick
(74) *Attorney, Agent, or Firm* — Crowell & Moring LLP

(57) ABSTRACT

A turbine fracturing system and a controlling method thereof, a controlling apparatus and a storage medium are provided. The turbine fracturing system includes: N turbine fracturing apparatuses, wherein each of the N turbine fracturing apparatuses comprises a turbine engine, and N is an integer greater than or equal to 2; a fuel gas supply apparatus connected to the N turbine engines, wherein the fuel gas supply apparatus is configured to supply fuel gas and distribute the fuel gas to the N turbine engines as gaseous fuel; and a fuel liquid supply apparatus connected to at least one of the N turbine engines and configured to supply liquid fuel to at least one of the N turbine engines in a case that at least one of a flow rate and a pressure of the fuel gas decreases.

20 Claims, 7 Drawing Sheets

(51) Int. Cl.
  *F02C 9/26*   (2006.01)
  *F02D 19/06*  (2006.01)
  *F02D 41/00*  (2006.01)
  *F04B 17/05*  (2006.01)

(52) U.S. Cl.
  CPC ..... *F02D 19/0647* (2013.01); *F02D 41/0027* (2013.01); *F04B 17/05* (2013.01); *F05D 2270/02* (2013.01); *F05D 2270/05* (2013.01); *F05D 2270/301* (2013.01)

(58) Field of Classification Search
  CPC .. F04B 17/05; F05D 2270/02; F05D 2270/05; F05D 2270/301
  See application file for complete search history.

(56) References Cited

U.S. PATENT DOCUMENTS

| | | | |
|---|---|---|---|
| 11,702,917 B2* | 7/2023 | Mao | F02D 19/0647 701/100 |
| 2014/0373822 A1* | 12/2014 | Rosswurm | F02D 41/0025 123/676 |
| 2016/0032703 A1 | 2/2016 | Broussard et al. | |
| 2018/0278124 A1 | 9/2018 | Oehring et al. | |

* cited by examiner

TURBINE FRACTURING SYSTEM, CONTROLLING METHOD THEREOF, CONTROLLING APPARATUS AND STORAGE MEDIUM

CROSS-REFERENCE TO RELATED APPLICATIONS

For all purposes, the present application is a continuation of and claims the benefit of priority to U.S. patent application Ser. No. 17/384,247 filed on Jul. 23, 2021, which claims priority to Chinese patent application No. 202110612965.6, filed on Jun. 2, 2021 under the title of "TURBINE FRACTURING SYSTEM, CONTROLLING METHOD THEREOF, CONTROLLING APPARATUS AND STORAGE MEDIUM". The entireties of these prior patent application are incorporated herein by reference as part of the present application.

TECHNICAL FIELD

Embodiments of the present disclosure relate to a turbine fracturing system and a controlling method thereof, a controlling apparatus and a computer-readable storage medium.

BACKGROUND

In a hydraulic fracturing system using a turbine engine to drive a plunger pump, the plunger pump is driven by the turbine engine. The turbine engine may use liquid diesel or natural gas as a fuel. The use of natural gas has considerable cost advantage. So natural gas is mostly used in actual production.

SUMMARY

According to first aspect of the present disclosure, it is provided a turbine fracturing system, comprising: N turbine fracturing apparatuses, wherein each of the N turbine fracturing apparatuses comprises a turbine engine, and N is an integer greater than or equal to 2; a fuel gas supply apparatus connected to N turbine engines, wherein the fuel gas supply apparatus is configured to supply fuel gas and distribute the fuel gas to the N turbine engines as gaseous fuel; and a fuel liquid supply apparatus connected to at least one of the N turbine engines and configured to supply liquid fuel to at least one of the N turbine engines in a case that at least one of a flow rate and a pressure of the fuel gas decreases.

In at least one embodiment, the turbine fracturing system further comprises a measurement and control apparatus, the measurement and control apparatus comprising a data acquisition device and a data processing device. The data acquisition device is in signal connection with the fuel gas supply apparatus, and configured to acquire first fuel gas data of the fuel gas and send the first fuel gas data to the data processing device. The data processing device comprises a comparison and determination circuit and a control circuit. The comparison and determination circuit is in signal connection with the data acquisition device, the comparison and determination circuit is configured to compare the first fuel gas data with a first threshold value and determine whether the first fuel gas data is smaller than the first threshold value; the first fuel gas data comprises the at least one of the pressure and the flow rate of the fuel gas, and the first threshold value comprises at least one of a first pressure threshold value corresponding to the pressure and a first flow rate threshold value corresponding to the flow rate. The control circuit is in signal connection with the comparison and determination circuit, the control circuit is configured to select the at least one of the N turbine engines and generate a first fuel switching signal in response to the first fuel gas data being smaller than the first threshold value. The first fuel switching signal is used for switching the gaseous fuel of the at least one of the N turbine engines into liquid fuel.

In at least one embodiment, the turbine fracturing system further comprises a fuel liquid storage device which is arranged on the turbine fracturing apparatus and connected with the turbine engine, and the fuel liquid supply apparatus supplies the liquid fuel to the at least one of the N turbine engines through the fuel liquid storage device. Each of the N turbine fracturing apparatuses further comprises a local control device in signal connection with the turbine engine. The control circuit is further configured to send the first fuel switching signal to the local control device which is in signal connection with the at least one of the N turbine engines as selected. The local control device is configured to switch the gaseous fuel of the at least one of the N turbine engines as selected to the liquid fuel according to the first fuel switching signal; the liquid fuel is supplied by the fuel liquid storage device connected to the at least one of the N turbine engines as selected.

In at least one embodiment, the turbine fracturing system further comprises a fuel gas delivery device connected with the turbine engine, and the fuel gas supply apparatus supplies the gaseous fuel to the turbine engine through the fuel gas delivery device. The local control device comprises a local control circuit and a switching circuit; the local control circuit is configured to receive the first fuel switching signal and control the switching circuit to realize switching from the gaseous fuel to the liquid fuel. The switching circuit is respectively connected to the fuel liquid storage device and the fuel gas delivery device which are arranged on a same turbine fracturing apparatus, and is configured to switch from the fuel gas delivery device to the fuel liquid storage device under a control of the local control circuit.

In at least one embodiment, the at least one of the N turbine engines as selected comprises a turbine engine with a longest operational time; the turbine engine with the longest operational time satisfies at least one of the following three conditions: a current liquid amount of the liquid fuel stored in the turbine engine is the largest; a load of the turbine engine is the smallest; and a ratio of the current liquid amount of the liquid fuel stored in the turbine engine to the load of the turbine engine is the highest.

In at least one embodiment, the data acquisition device is further configured to acquire second fuel gas data of the fuel gas and send the second fuel gas data to the data processing device, and the second fuel gas data comprises a change rate of the first fuel gas data. The comparison and determination circuit is further configured to compare the second fuel gas data with a change rate threshold value and send a comparison result to the control circuit. The control circuit is further configured to adjust a total displacement of the turbine fracturing system according to the comparison result.

In at least one embodiment, the change rate of the first fuel gas data comprises a reduction rate of the first fuel gas data, and the change rate threshold value comprises a reduction rate threshold value of the first fuel gas data. The comparison and determination circuit is further configured to compare the second fuel gas data with the reduction rate threshold value of the first fuel gas data and determine whether the second fuel gas data is greater than or equal to the reduction rate threshold value of the first fuel gas data. The control circuit is further configured to generate a first displacement reduction signal for reducing the total displacement of the turbine fracturing system in response to the second fuel gas data being greater than or equal to the reduction rate threshold value of the first fuel gas data.

In at least one embodiment, the fuel liquid supply apparatus comprises N fuel liquid storage devices which are arranged on the N turbine fracturing apparatuses in one-to-one correspondence and connected with the N turbine engines in one-to-one correspondence. The data acquisition device is further configured to acquire a current total liquid amount of the liquid fuels stored in all the N fuel liquid storage devices and send the current total liquid amount to the data processing device. The comparison and determination circuit is further configured to compare the current total liquid amount with a total liquid amount threshold value and determine whether the current total liquid amount is smaller than the total liquid amount threshold value. The control circuit is further configured to generate a second displacement reduction signal for reducing the total displacement of the turbine fracturing system in response to the current total liquid amount being smaller than the total liquid amount threshold value.

In at least one embodiment, the comparison and determination circuit is further configured for: determining whether a turbine engine having switched to the liquid fuel is existed, in response to the first fuel gas data being greater than or equal to the first threshold value; and comparing the first fuel gas data and a second threshold value and determining whether the first fuel gas data is greater than or equal to the second threshold value, in response to the turbine engine having switched to the liquid fuel being existed, wherein the second threshold value is greater than the first threshold value. The control circuit is further configured to generate a second fuel switching signal for switching the liquid fuel of the turbine engine having switched to the liquid fuel back to the gaseous fuel in response to the first fuel gas data being greater than or equal to the second threshold value.

In at least one embodiment, the control circuit is further configured to acquire a total number M of the turbine engines having switched to the liquid fuel, wherein M is a positive integer smaller than N; the control circuit is further configured to select a turbine engine with the shortest operational time among M turbine engines and generate the second fuel switching signal for switching the liquid fuel of the turbine engine with the shortest operational time back to the gaseous fuel. The turbine engine with the shortest operational time satisfies at least one of the following three conditions: a current liquid amount of the liquid fuel stored in the turbine engine is the smallest; a load of the turbine engine is the largest; and a ratio of the current liquid amount of the liquid fuel stored in the turbine engine to the load of the turbine engine is the lowest.

According to second aspect of the present disclosure, it is provided a controlling method of a turbine fracturing system, comprising: acquiring first fuel gas data of fuel gas, wherein the fuel gas is distributed to N turbine engines and used as gaseous fuel of the N turbine engines, and N is an integer greater than or equal to 2; determining whether at least one of a flow rate and a pressure of the fuel gas decreases according to the first fuel gas data; and supplying liquid fuel to the at least one of N turbine engines in response to a decrease in the at least one of the flow rate and the pressure of the fuel gas.

In at least one embodiment, the determining whether the at least one of the flow rate and the pressure of the fuel gas decreases according to the first fuel gas data comprises: comparing the first fuel gas data with a first threshold value, and determining whether the first fuel gas data is smaller than the first threshold value; the first fuel gas data comprises the at least one of the pressure and the flow rate of the fuel gas, and the first threshold value comprises at least one of a first pressure threshold value corresponding to the pressure and a first flow rate threshold value corresponding to the flow rate. The supplying the liquid fuel to the at least one of the N turbine engines in response to the decrease in the at least one of the flow rate and the pressure of the fuel gas comprises: selecting the at least one of the N turbine engines and switching the gaseous fuel of the at least one of the N turbine engines to the liquid fuel in response to the first fuel gas data being smaller than the first threshold value.

In at least one embodiment, the selecting the at least one of the N turbine engines and the switching the gaseous fuel of the at least one of the N turbine engines to the liquid fuel in response to the first fuel gas data being smaller than the first threshold value comprises: selecting a turbine engine with the longest operational time among the N turbine engines, and switching the gaseous fuel of the turbine engine with the longest operational time to the liquid fuel. The turbine engine with the longest operational time satisfies at least one of the following three conditions: a current liquid amount of the liquid fuel stored in the turbine engine is the largest; a load of the turbine engine is the smallest; and a ratio of the current liquid amount of the liquid fuel stored in the turbine engine to the load of the turbine engine is the highest.

In at least one embodiment, the controlling method of the turbine fracturing system further comprises: determining whether the gaseous fuels of all the N turbine engines are switched to liquid fuels.

In at least one embodiment, the controlling method of the turbine fracturing system further comprises: acquiring second fuel gas data of the fuel gas in response to the gaseous fuels of all the N turbine engines being switched to liquid fuels, wherein the second fuel gas data comprises a change rate of the first fuel gas data; comparing the second fuel gas data with a change rate threshold value; and adjusting a total displacement of the turbine fracturing system according to a comparison result.

In at least one embodiment, the change rate of the first fuel gas data comprises a reduction rate of the first fuel gas data, and the change rate threshold value comprises a reduction rate threshold value of the first fuel gas data. The comparing the second fuel gas data with the change rate threshold value comprises: comparing the second fuel gas data with the reduction rate threshold value of the first fuel gas data, and determining whether the second fuel gas data is greater than or equal to the reduction rate threshold value of the first fuel gas data. The adjusting the total displacement of the turbine fracturing system according to the comparison result comprises: reducing the total displacement of the turbine fracturing system in response to the second fuel gas data being greater than or equal to the reduction rate threshold value of the first fuel gas data.

In at least one embodiment, the controlling method of the turbine fracturing system further comprises: acquiring a current total liquid amount of liquid fuels stored in all the N turbine engines in response to the gaseous fuels of all the N turbine engines being switched to the liquid fuels; comparing the current total liquid amount with a total liquid amount threshold value; and adjusting the total displacement of the turbine fracturing system according to a comparison result.

In at least one embodiment, the comparing the current total liquid amount with the total liquid amount threshold value comprises: comparing the current total liquid amount with the total liquid amount threshold value, and determine whether the current total liquid amount is smaller than the total liquid amount threshold value. The adjusting the total displacement of the turbine fracturing system according to the comparison result comprises: reducing the total displacement of the turbine fracturing system in response to the current total liquid amount being smaller than the total liquid amount threshold value.

In at least one embodiment, the controlling method of the turbine fracturing system further comprises: determining whether a turbine engine having switched to the liquid fuel is existed, in response to the first fuel gas data being greater than or equal to the first threshold value; comparing the first fuel gas data and a second threshold value and determining whether the first fuel gas data is greater than or equal to the second threshold value, in response to the turbine engine having switched to the liquid fuel being existed, wherein the second threshold value is greater than the first threshold value; and switching the liquid fuel of the turbine engine having switched to the liquid fuel back to the gaseous fuel in response to the first fuel gas data being greater than or equal to the second threshold value.

According to third aspect of the present disclosure, it is provided a controlling apparatus, comprising: a processor; and a memory, wherein a computer-executable code is stored in the memory, and the computer-executable code is configured to execute the above-mentioned controlling method of the turbine fracturing system when executed by the processor.

According to fourth aspect of the present disclosure, it is provided a computer-readable storage medium stored with a computer-executable code, wherein the computer-executable code causes a processor to execute the above-mentioned controlling method of the turbine fracturing system when executed by the processor.

BRIEF DESCRIPTION OF THE DRAWINGS

In order to illustrate the technical solution of the embodiments of the disclosure, the drawings of the embodiments will be briefly described in the following. the drawings are only intended for example embodiments of the disclosure and thus are not limitative of the disclosure.

DETAILED DESCRIPTION

Figure 1A:
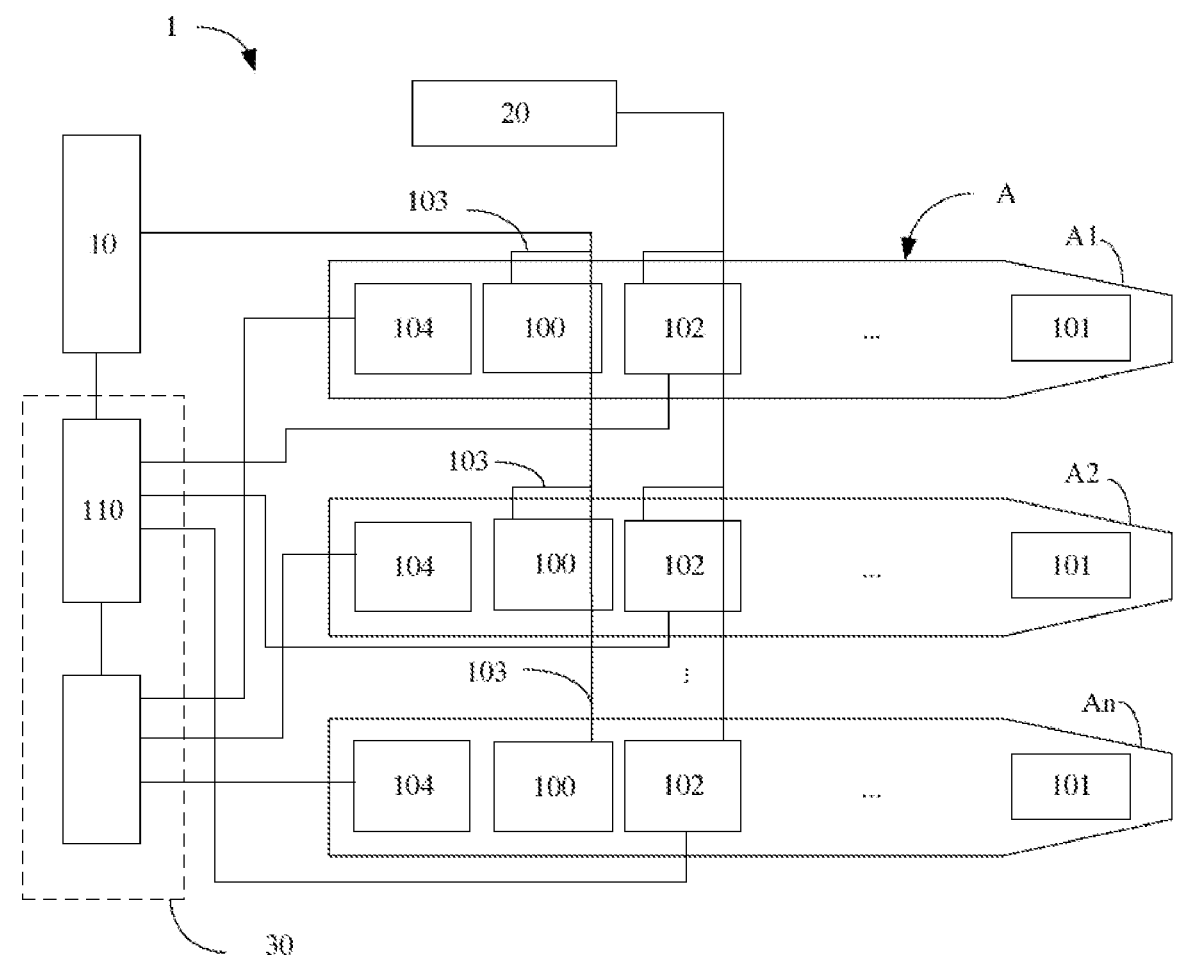
FIG. 1A is a schematic diagram of a turbine fracturing system provided according to an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those having ordinary skill in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and in the case that the position of the object which is described is changed, the relative position relationship may be changed accordingly.

At present, in gas turbine engines, in addition to compressed natural gas (CNG), liquefied natural gas (LNG) can also be used. There are many ways to supply the natural gas, for example, it can be delivered to a turbine engine by a CNG tanker via a CNG pressure regulating apparatus, or by an LNG tanker via an LNG gasification conveying apparatus, etc. In the case that switching the tankers, it may, sometimes, involve the problem of insufficient natural gas at the supply side. In such case, operators are required to manually switch the fuel depending on field conditions of well sites. If a manual switching operation fails or is not done timely, it may not only result in the turbine fracturing apparatus unable to continue working (e.g., shutting down), but also cannot guarantee the operation safety of operators.

At least one embodiment of the present disclosure provides a turbine fracturing system, the turbine fracturing system includes: N turbine fracturing apparatuses, each of the N turbine fracturing apparatuses includes a turbine engine, and N is an integer greater than or equal to 2; a fuel gas supply apparatus connected to N turbine engines, the fuel gas supply apparatus is configured to supply fuel gas and distribute the fuel gas to the N turbine engines as gaseous fuel; and a fuel liquid supply apparatus connected to at least one of the N turbine engines and configured to supply liquid fuel to the at least one of the N turbine engines in a case that at least one of a flow rate and a pressure of the fuel gas decreases.

In the turbine fracturing system provided by at least one embodiment of the present disclosure, in the case that at least one of the flow rate and pressure of the fuel gas decreases, the fuel liquid supply apparatus supplies liquid fuel to at least one of the N turbine fracturing apparatuses. That is, in the case that the fuel gas supplied by the fuel gas supply apparatus is insufficient, the fuel liquid supply apparatus can be controlled to automatically supply liquid fuel to the turbine engine, so that the normal operation of the N turbine fracturing apparatuses can be ensured and the turbine fracturing system can maintain a normal displacement output. Moreover, because the switching from gaseous fuel to liquid fuel is automatically completed, the operation safety of operators is improved and the labor intensity of manual operation is reduced.

In the embodiment of the present disclosure, the "flow rate" refers to the amount of fluid (liquid or gas) flowing through the effective cross-section of a closed pipeline or open channel per unit time, also known as instantaneous flow rate. When the amount of fluid is expressed by volume, it is called volume flow rate; when the amount of fluid is expressed by mass, it is called mass flow rate. For example, the "gas flow rate" refers to the volume of gas flowing through the flow section per unit time under a certain pressure and a certain temperature.

In the embodiment of the present disclosure, the fuel supplied to the turbine engine includes combustible gaseous fuel (fuel gas for short) or combustible liquid fuel (fuel liquid for short). For example, the fuel gas includes compressed natural gas (CNG). For example, the fuel liquid includes diesel, bio-fuel oil or liquefied natural gas (LNG), etc.

In the embodiment of the present disclosure, by acquiring relevant status data of the fuel gas output from the fuel gas supply apparatus, such as the pressure and/or flow rate of the fuel gas, the supply status of the fuel gas can be determined, and then the automatic switching from gaseous fuel to liquid fuel can be realized according to the supply status.

Hereinafter, the present disclosure will be explained by several specific embodiments. In order to keep the following description of the embodiments of the present disclosure clear and concise, detailed descriptions of known functions and known components may be omitted. In the case that any component of an embodiment of the present disclosure appears in more than one figure, the component may be denoted by the same reference numeral in each of the figures.

FIG. 1A is a schematic diagram of a turbine fracturing system provided according to an embodiment of the present disclosure. As shown in FIG. 1A, the turbine fracturing system 1 includes N turbine fracturing apparatuses A, a fuel gas supply apparatus 10, and a fuel liquid supply apparatus 20, wherein N is an integer greater than or equal to 2. For example, the N turbine fracturing apparatuses are turbine fracturing apparatuses A1, A2 . . . . An. Each of the turbine fracturing apparatuses A includes a turbine engine 100. In the embodiment of the present disclosure, the turbine fracturing apparatus is a vehicle-mounted or a semi-trailer-mounted or a skid-mounted apparatus. For example, the turbine fracturing apparatus includes a turbine fracturing trailer. For example, the turbine fracturing apparatus includes a turbine fracturing trailer group composed of a plurality of turbine fracturing trailers.

For example, the turbine fracturing apparatus A further includes a plunger pump 101, and the turbine engine 100 is connected with the plunger pump 101 so that kinetic energy generated by the turbine engine 100 is transmitted to the plunger pump 101. In an example, the turbine fracturing apparatus A may further include a reduction gearbox and a transmission mechanism (not shown) disposed between the turbine engine 100 and the plunger pump 101. An output end of the turbine engine 100 is connected with the reduction gearbox; and the reduction gearbox and the plunger pump 101 are in transmission connection there-between through the transmission mechanism. Compared with the traditional fracturing device by using diesel engine as power source, the plunger pump is driven by the turbine engine which has large power-volume ratio and small occupied area, thus greatly reducing the number of fracturing apparatuses and the occupied area of the entire fracturing system.

As shown in FIG. 1A, a fuel gas supply apparatus 10 is connected to the N turbine engines and is configured to supply fuel gas and distribute the fuel gas to the N turbine engines as gaseous fuel.

Figure 2:
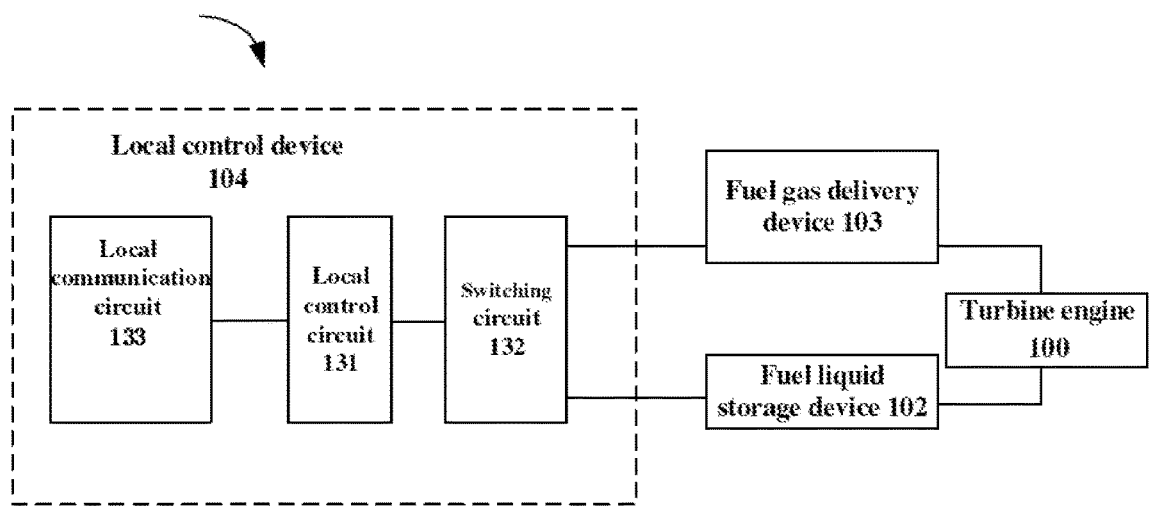
FIG. 2 is a schematic diagram of a turbine fracturing apparatus provided according to an embodiment of the present disclosure.

FIG. 2 is a schematic diagram of a turbine fracturing apparatus provided according to an embodiment of the present disclosure.

As shown in FIGS. 1A and 2, for example, the turbine fracturing system 1 further includes a fuel gas delivery device 103. The fuel gas delivery device 103 is connected to the turbine engine 100. The fuel gas supply apparatus 10 supplies the gaseous fuel to the turbine fracturing apparatus A through the fuel gas delivery device 103. That is, one end of the fuel gas delivery device 103 is connected with the fuel gas supply apparatus 10, and the other end is connected with the turbine fracturing apparatus 100. In this way, in the case that the fuel gas in the fuel gas supply apparatus 10 is reduced, the gaseous fuel delivered to the turbine engine 100 can be controlled by controlling the fuel gas delivery device 103 on the turbine fracturing apparatus A (for example, switching from gaseous fuel to liquid fuel).

For example, the fuel gas delivery device includes a delivery pipeline. The delivery pipeline includes, for example, a main pipeline and a plurality of branch pipelines connected with the main pipeline; one end of the main pipeline is communicated with the fuel gas supply apparatus 10, and the other end is communicated with the plurality of branch pipelines; and each of the branch pipelines is communicated with one of the turbine engines. In this way, the fuel gas supply apparatus 10 can distribute the fuel gas to the N turbine engines.

In an embodiment of the present disclosure, the fuel gas supply apparatus 10 is, for example, a CNG tanker, and the number of CNG tankers may be one or more. For example, the fuel gas supply apparatus 10 delivers the fuel gas to N turbine engines through N fuel gas delivery devices 103 in one-to-one correspondence, which can prevent the gas from leaking during the delivery process of gas so as to improve the safety.

Optionally, a CNG pressure regulating device is further arranged between the CNG tanker and the fuel gas delivery device 103, and natural gas is delivered from the CNG tanker to the turbine engine 100 after the pressure of the natural gas is regulated by the CNG pressure regulating device. In this way, the pressure of the fuel gas can be conveniently adjusted according to demands of actual production.

For example, the number of fuel gas delivery devices 103 is N, and the N fuel gas delivery devices 103 are connected with the N turbine engines 100 in one-to-one correspondence. It can be understood that the N fuel gas delivery devices shown in FIG. 1A are merely illustrative, and the number of the fuel gas delivery devices 103 can be larger or smaller than N. For example, in the case that the number of the fuel gas delivery devices 103 is smaller than N, each of the fuel gas delivery devices 103 can supply gaseous fuel to two or more turbine engines 100 simultaneously. In the embodiment of the present disclosure, an example in which N fuel gas delivery devices 103 are adopted is preferable, because it's beneficial to realize independent control of gaseous fuel to the N turbine engines 100.

For example, the fuel liquid supply apparatus 20 is connected to at least one of the N turbine engines and is configured to supply liquid fuel to at least one of the N turbine fracturing apparatuses A in the case that at least one of the flow rate and pressure of the fuel gas decreases. In the case that at least one of the flow rate and pressure of the fuel gas decreases, the flow rate and/or pressure of the gaseous fuel delivered to the plurality of fuel gas delivery devices 103 would be reduced correspondingly, and if liquid fuel is not supplied, the problem of apparatus shutdown is likely to occur. In the embodiment of the present disclosure, by utilizing the fuel liquid supply apparatus 20 to supply liquid fuel to at least one of the N turbine fracturing apparatuses A, the above-mentioned problem of apparatus shutdown can be avoided, and the normal operation of the turbine fracturing apparatuses A can be effectively ensured.

For example, as shown in FIGS. 1A and 2, the turbine fracturing system 1 further includes a fuel liquid storage device 102, which is arranged on the turbine fracturing apparatus A and connected to the turbine engine 100. The fuel liquid supply apparatus 20 supplies the liquid fuel to the turbine engine through the fuel liquid storage device 102. That is, one end of the fuel liquid storage device 102 is connected with the fuel liquid supply apparatus 20, and the other end is connected with the turbine engine 100.

In the embodiment of the present disclosure, the fuel liquid supply apparatus 20 is, for example, a diesel vehicle, and the number of the diesel vehicle may be one or more. For example, the fuel liquid supply apparatus 20 can be connected with the fuel liquid storage device 102 through a fuel liquid delivery device, which can prevent from liquid leakage during the liquid delivery so as to improve the safety.

For example, the number of the fuel liquid storage devices 102 is N, and the N fuel liquid storage devices 102 are connected with the N turbine engines 100 in one-to-one correspondence. It can be understood that the N fuel liquid storage devices 102 shown in FIG. 1A are merely illustrative, and the number of the fuel liquid storage devices 102 can be larger or smaller than N. For example, in the case that the number of the fuel liquid storage devices 102 is smaller than N, each of the fuel liquid storage devices 102 can supply liquid fuel to two or more turbine engines 100 simultaneously. In the embodiment of the present disclosure, an example in which N fuel liquid storage devices 102 are adopted is preferable because it's beneficial to realize independent control of liquid fuel to the N turbine engines 100.

Figure 1B:
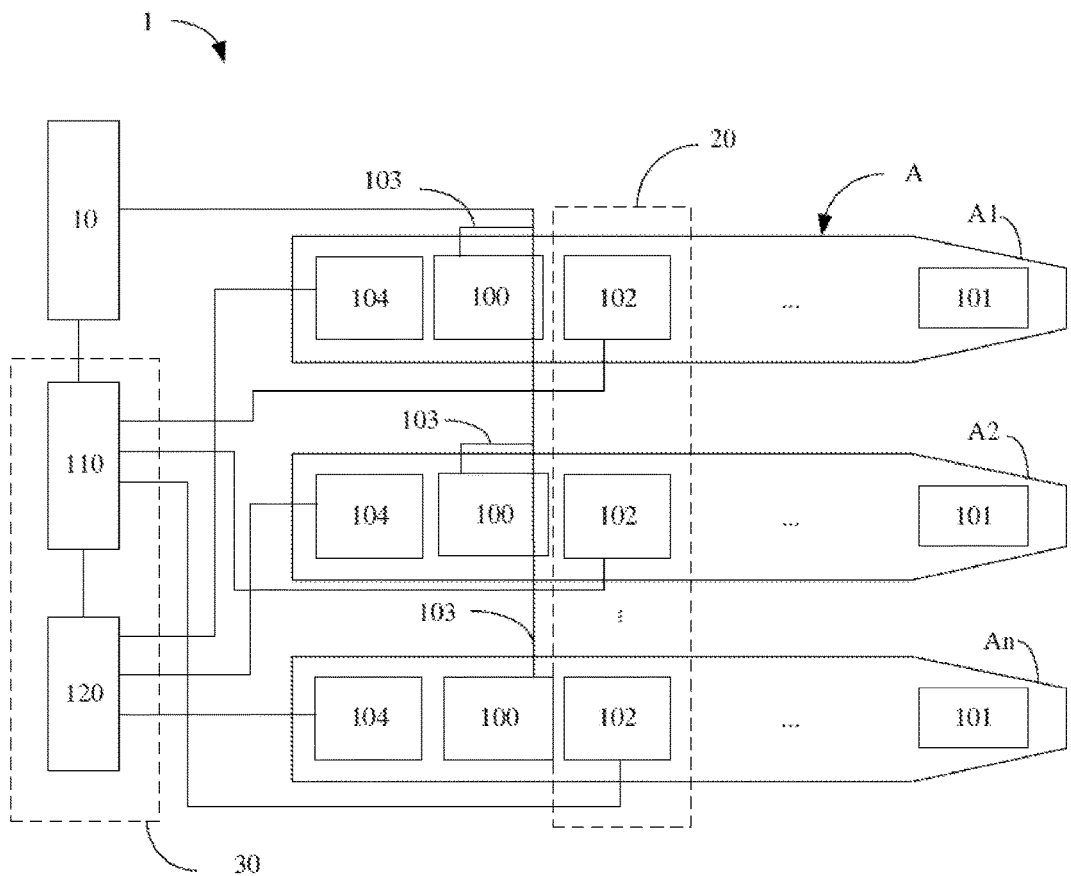
FIG. 1B is a schematic diagram of a turbine fracturing system provided according to another embodiment of the present disclosure.

FIG. 1B is a schematic diagram of a turbine fracturing system provided according to another embodiment of the present disclosure. Compared with the turbine fracturing system of FIG. 1A, an independent fuel liquid supply apparatus 20 is not provided in FIG. 1B; instead, the fuel liquid supply apparatus 20 includes a fuel liquid storage device 102 provided on each of the turbine fracturing apparatuses A. That is, the fuel liquid supply apparatus 20 includes N fuel liquid storage devices 102, and the N fuel liquid storage devices 102 are connected with N turbine engines in one-to-one correspondence. Since each of the fuel liquid storage devices 102 stores fuel liquid, the fuel liquid can be supplied to the corresponding turbine fracturing apparatus A thereof.

In the case that the turbine fracturing apparatus A is a turbine fracturing trailer, the fuel liquid storage device 102 can move along with the turbine fracturing trailer so as to continuously supply fuel liquid to the turbine engine 100 while moving, which is more suitable for the use of the turbine fracturing apparatus in different occasions.

Figure 3:
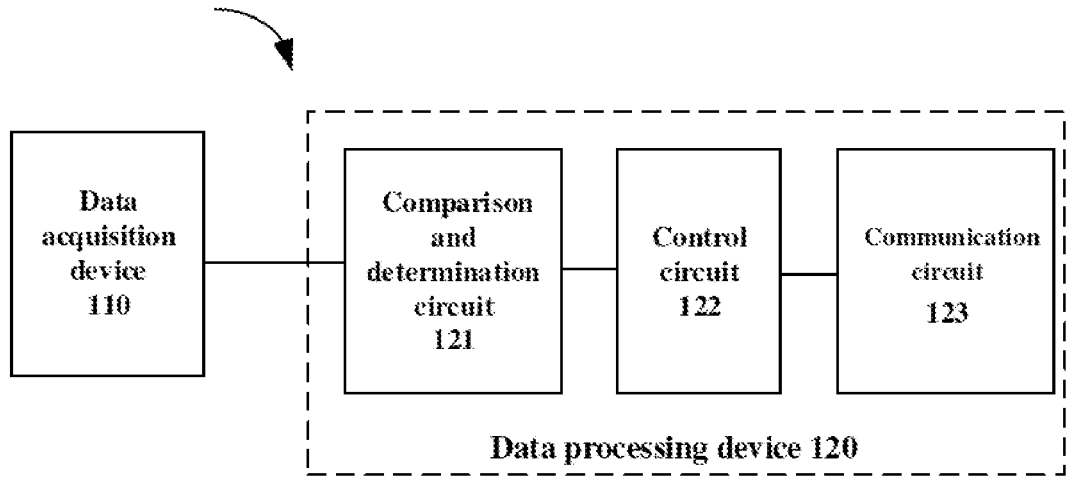
FIG. 3 is a schematic diagram of a measurement and control apparatus provided according to an embodiment of the present disclosure.

FIG. 3 is a schematic diagram of a measurement and control apparatus provided according to an embodiment of the present disclosure. The measurement and control apparatus in FIG. 3 can be applied to both the turbine fracturing system in FIG. 1A and the turbine fracturing system in FIG. 1B. Hereinafter, the measurement and control apparatus applied to the turbine fracturing system of FIG. 1A will be described as an example.

For example, as shown in FIGS. 1A and 3, the turbine fracturing system 1 further includes a measurement and control apparatus 30. For example, the measurement and control apparatus 30 includes a data acquisition device 110 and a data processing device 120. The data acquisition device 110 is in signal connection with the fuel gas supply apparatus 10. The data acquisition device 110 is configured to acquire first fuel gas data of the fuel gas and send the first fuel gas data to the data processing device 120.

For example, one end of the data acquisition device 110 is connected with the fuel gas supply apparatus 10, and the other end is in signal connection with the data processing device 120. In this way, the fuel gas output by the fuel gas supply apparatus 10 can be acquired by the data acquisition device 110 in real time to generate the first fuel gas data, and then the data acquisition device 110 sends the first fuel gas data as acquired to the data processing device 120.

For example, the first fuel gas data includes at least one of pressure and flow rate of the fuel gas. That is, the data acquisition device 110 may be configured to acquire only the pressure of the fuel gas, or only the flow rate of the fuel gas, or both the pressure and the flow rate. A person having ordinary skill in the art can determine the data type of the fuel gas to be acquired according to actual needs, which is not specifically limited by the embodiments of the present disclosure.

For example, the data acquisition device 110 includes a component for measuring the pressure of the fuel gas, such as a pressure sensor. In another example, the data acquisition device 110 includes a component for measuring the flow rate of the fuel gas, such as a gas flowmeter. It can be understood that the components for measuring the pressure or the flow rate of the fuel gas are not specifically limited in the embodiments of this disclosure, and any components that can realize the above-mentioned measurement function can be applied to the embodiments of this application.

For example, as shown in FIG. 3, the data processing device 120 includes a comparison and determination circuit 121 and a control circuit 122. The comparison and determination circuit 121 is connected to the data acquisition device 110. The comparison and determination circuit 121 is configured to compare the first fuel gas data with a first threshold value and determine whether the first fuel gas data is smaller than the first threshold value. For example, the first threshold value includes at least one of a first pressure threshold value corresponding to the pressure and a first flow rate threshold value corresponding to the flow rate.

For example, the comparison and determination circuit includes a comparison circuit. Optionally, the comparison and determination circuit further includes an amplifier, a filter, an analog-to-digital converter, etc., so as to better compare and process the fuel gas data as acquired. For example, the control circuit includes a controller.

For example, in the case that the first fuel gas data is gas pressure, the comparison and determination circuit 121 is configured to compare the gas pressure with a first pressure threshold value. For example, in the case that the first fuel gas data is gas flow rate, the comparison and determination circuit 121 is configured to compare the gas flow rate with a first flow rate threshold value. For example, in the case that the first fuel gas data includes both gas pressure and gas flow rate, the comparison and determination circuit 121 is configured to compare the gas pressure with the first pressure threshold value and compare the gas flow rate with the first flow rate threshold value.

In this way, after comparing the first fuel gas data with the first threshold value, it can be determined whether the first fuel gas data is smaller than the first threshold value, thereby confirming whether the flow rate or pressure of the fuel gas output from the fuel gas supply apparatus 10 is decreased. In actual operation, because the accuracy of flow detection may be better and more intuitive than that of pressure detection, it is preferable to set the first fuel gas data as gas flow rate and compare the gas flow rate with the first gas threshold value.

For example, the first pressure threshold value includes 90% to 95% of a standard pressure, and the first flow rate threshold value includes 90% to 95% of a standard flow rate. Further, the first pressure threshold value is 95% of the standard pressure, and the first flow rate threshold value is 95% of the standard flow rate. In actual production, the standard pressure and standard flow rate refer to design parameters of the pressure or flow rate of the fuel gas adopted in the field of hydraulic fracturing. The first pressure threshold value can be regarded as an alarm pressure range of the turbine fracturing apparatus. No matter whether the pressure or the flow rate is utilized, if the lower limit of the threshold value is set to be small (for example, 80%), it would cause a switching failure; and if the upper limit of the threshold value is set to be great (for example, 98%), it would have no buffering space and may cause frequent switching, which goes against a normal and stable operation of the apparatus. Therefore, it is preferable to use 90% to 95% of the standard pressure as the gas pressure, and/or, to use 90% to 95% of the standard flow rate as the gas flow rate.

For example, as shown in FIG. 3, the comparison and determination circuit 121 sends the comparison result to the control circuit 122. The control circuit 122 is in signal connection with the comparison and determination circuit 121. The control circuit 122 is configured to select at least one of the N turbine engines 100 and generate a first fuel switching signal in response to the first fuel gas data being smaller than the first threshold value. The first fuel switching signal is used for switching the gaseous fuel of at least one of the N turbine engines 100 to liquid fuel.

In case of a fuel gas supply shortage occurred in the well site, the data acquisition device 110 sends the first fuel gas data detected in real time to the comparison and determination circuit 121. Then, the comparison and determination circuit 121 sends the comparison result to the control circuit 122. The control circuit 122 automatically generates a first fuel switching signal for switching gaseous fuel to liquid fuel according to the comparison result (i.e., the first fuel gas data is smaller than the first threshold value), thereby further ensuring the normal operation of the turbine fracturing apparatus in the switching process and improving the operation safety of operators.

In the case where the first fuel gas data is the gas pressure, by way of example, if the gas pressure is smaller than the first pressure threshold value, the control circuit 122 selects one of the N turbine engines 100 (for example, the turbine engine 100 on the turbine fracturing apparatus A1) and generates a first fuel switching signal corresponding to the selected turbine engine 100. The first fuel switching signal is used for instructing the selected turbine engine 100 to switch from gaseous fuel to liquid fuel. It can be understood that the control circuit 122 can select two or more turbine engines 100 for fuel switching, and the embodiments of the present disclosure are not intended to limit the number of turbine engines 100 to be switched.

For example, as shown in FIGS. 1A and 2, each of the turbine fracturing apparatuses A further includes a local control device 104. For example, the local control device 104 is arranged on the turbine fracturing apparatus A, one end of the local control device 104 is in signal connection with the data processing device 120 and the other end is in signal connection with the turbine engine 100.

For example, the control circuit 122 of the data processing device 120 is further configured to send the first fuel switching signal to the local control device 104 which is in signal connection with the at least one turbine engine 100 as selected.

For example, as shown in FIG. 3, the data processing device 120 further includes a communication circuit 123. The local control device 104 includes a local communication circuit 133, as shown in FIG. 2. The communication circuit 123 and the local communication circuit 133 can realize signal or data transmission there-between through wired or wireless communication. The wired communication includes but is not limited to Ethernet, serial communication, etc. The wireless communication includes but is not limited to infrared, bluetooth, WiFi, GPRS, ZigBee, RFID (radio frequency identification), 4G mobile communication, 5G mobile communication and other communication protocols.

In the case that the control circuit 122 of the measurement and control apparatus 30 generates the first fuel switching signal, the measurement and control apparatus 30 can transmit the first fuel switching signal to the local control device 104 which is in signal connection with the selected turbine engine 100, by using the communication circuit 123 and the local communication circuit 133. The local control device 104 is configured to switch the gaseous fuel of the selected turbine engine 100 to liquid fuel according to the first fuel switching signal. Compared with the manual switching of gaseous fuel to liquid fuel by operators, the above-described process not only realizes automatic switching but also avoids apparatus shutdown, thereby ensuring the safety of operators and saving considerable manpower and material costs.

For example, as shown in FIG. 1A, each of the turbine fracturing apparatuses A is provided with the fuel liquid storage device 102; in order to control the supply of liquid fuel conveniently, the liquid fuel supplied to the selected turbine engine 100 can be provided by the fuel liquid storage device 102 on the same turbine fracturing apparatus A as the selected turbine engine 100, that is, by the fuel liquid storage device 102 connected to the selected turbine engine 100.

For example, as shown in FIG. 2, the local control device 104 further includes: a local control circuit 131 in signal connection with the local communication circuit 133; and a switching circuit 132 in signal connection with the local control circuit 131. The local control circuit 131 is configured to receive the first fuel switching signal and control the switching circuit 132 to realize switching from the gaseous fuel to the liquid fuel. For example, the switching circuit 132 includes a selector switch.

For example, as shown in FIG. 2, a first end E1 of the switching circuit 132 is in signal connection with the local control circuit 131. A second end E2 and a third end E3 are respectively connected to the fuel liquid storage device 102 and the fuel gas delivery device 103 provided on the same turbine fracturing apparatus A. Under the control of the local control circuit 131, the switching circuit 132 can switch the fuel gas delivery device 103 to the fuel liquid storage device 102. In an example, the second end E2 and the third end E3 of the switching circuit 132 include a first control valve and a second control valve respectively connected to the fuel liquid storage device 102 and the fuel gas delivery device 103. By opening the first control valve and closing the second control valve at the same time, the fuel of the turbine engine can be switched from gaseous fuel to liquid fuel. For example, by gradually opening the first control valve and gradually closing the control valve, a smooth switching can be ensured, and the switching time lasts for about 15 seconds.

In the embodiment of the present disclosure, in order to allow the turbine fracturing apparatus to operate for a longer time after switching, when selecting a turbine engine to be switched, the turbine engine with the longest operational time can be selected for switching, thus further avoiding the shutdown of the turbine fracturing apparatus caused by insufficient fuel supply after switching.

For example, the at least one turbine engine 100 as selected includes the turbine engine 100 with the longest operational time. The turbine engine 100 with the longest operational time satisfies at least one of the following three conditions: a) the current liquid amount of liquid fuel stored in the turbine engine 100 is the largest; B) the load of the turbine engine 100 is the smallest; and c) the ratio of the current liquid amount of liquid fuel stored in the turbine engine 100 to the load of the turbine engine 100 is the highest.

In the well site, an "oil amount-load ratio" is a result of the current amount of liquid oil being divided by the current load. If the oil amount-load ratio is relatively high, it means that the apparatus can run for a long time under the current oil amount of liquid oil; on the contrary, the running time is shorter. Therefore, among the above three conditions, it is preferable to select the turbine engine 100 satisfying the condition c) for fuel switching.

As mentioned above, in the case that the first fuel gas data falls below the first threshold value due to insufficient fuel gas supply, the turbine engine on at least one turbine fracturing apparatus can be selected to switch the fuel thereof from gaseous fuel to liquid fuel. If the first fuel gas data continues to drop and drop speed is fast, the normal operation of the turbine fracturing trailer group may not be guaranteed even if the fuel is switched to liquid fuel. At this time, it is possible to adjust the total displacement of the turbine fracturing system 1. The embodiment of the present disclosure also provides two ways of automatically adjusting the displacement, which will be described separately below.

In another embodiment of the present disclosure, the data acquisition device 110 is further configured to acquire second fuel gas data of the fuel gas and send the second fuel gas data to the data processing device 120. For example, the second fuel gas data includes a change rate of the first fuel gas data. The comparison and determination circuit 121 is further configured to compare the second fuel gas data with a change rate threshold value and send a comparison result to the control circuit 122. The control circuit 122 is further configured to adjust the total displacement of the turbine fracturing system 1 according to the comparison result.

Generally, the total displacement of the turbine fracturing system refers to the preset displacement of the turbine fracturing trailer group. In the actual well site, the turbine fracturing trailer group includes N turbine fracturing apparatuses, so the preset displacement of the turbine fracturing trailer group is equal to the sum of the preset displacements of the N turbine fracturing apparatuses.

For example, the change rate of the first fuel gas data includes a reduction rate of the first fuel gas data, and the change rate threshold value includes a reduction rate threshold value of the first fuel gas data. The comparison and determination circuit 121 is further configured to compare the second fuel gas data with the reduction rate threshold value of the first fuel gas data, and determine whether the second fuel gas data is greater than or equal to the reduction rate threshold value of the first fuel gas data. For example, the reduction rate of the first fuel gas data includes at least one of a reduction rate of gas flow rate and a reduction rate of gas pressure.

For example, in the case that the second fuel gas data is greater than or equal to the reduction rate threshold value of the first fuel gas data, the control circuit 122 is further configured to generate a first displacement reduction signal for reducing the total displacement of the turbine fracturing system 1 in response to the second fuel gas data being greater than or equal to the reduction rate threshold value of the first fuel gas data. Then, the control circuit 122 sends the first displacement reduction signal to the local control device 104 on each of the turbine fracturing apparatuses A. The local control device 104 adjusts the displacement of the corresponding turbine fracturing apparatus, thereby reducing the total displacement of the turbine fracturing system 1.

In the above embodiments of the present disclosure, the turbine control system can automatically adjust the total displacement of the turbine fracturing system in real time according to the fuel gas supply status, thereby further ensuring the normal and stable operation of the turbine fracturing trailer group. For example, the total displacement of the turbine fracturing system refers to the preset displacement of the turbine fracturing system.

For example, in the case that the preset displacement decreases, the turbine fracturing system will redistribute the displacement of each of the turbine fracturing apparatuses in the turbine fracturing system according to the new preset displacement value. For example, the automatic allocation of the turbine fracturing system follows the principle of load balancing, that is, the displacement of the apparatus with higher load is preferentially reduced.

For example, the reduction rate threshold value includes a reduction rate preset value per unit time. In one example, the reduction rate threshold value is 5% to 15% of the reduction rate preset value per unit time, for example, 10%. For example, in the case that the reduction rate of gaseous fuel per unit time is higher than 10% of the preset value, the turbine control system will reduce the total displacement of the turbine fracturing system according to the reduction rate to prevent the sudden drop of the gas supply system from affecting the operation.

In another embodiment of the present disclosure, as shown in FIG. 1A, the data acquisition device 110 is in signal connection with each of the N fuel liquid storage devices 102. The data acquisition device 110 is further configured to acquire the current total liquid amount of liquid fuels stored in all the N fuel liquid storage devices 102 and send the current total liquid amount to the data processing device 120. As shown in FIG. 1A, for example, N fuel liquid storage devices 102 are arranged on the N turbine fracturing apparatuses A in one-to-one correspondence, and are connected to the turbine engines 100 in one-to-one correspondence. The comparison and determination circuit 121 is further configured to compare the current total liquid amount with the total liquid amount threshold value, and determine whether the current total liquid amount is smaller than the total liquid amount threshold value. In the case that the current total liquid amount is smaller than the total liquid amount threshold value, the control circuit 122 is further configured to generate a second displacement reduction signal for reducing the total displacement of the turbine fracturing system 1 in response to the current total liquid amount being smaller than the total liquid amount threshold value.

In the above embodiments of the disclosure, the turbine control system can automatically adjust the total displacement of the turbine fracturing system in real time according to the current storage status of liquid fuel, thereby further ensuring the normal and stable operation of the turbine fracturing trailer group.

As described in the previous embodiments, in the case that the preset displacement is reduced, the turbine fracturing system will redistribute the displacement of each of the turbine fracturing apparatuses in the turbine fracturing system according to the new preset displacement value. For example, the automatic allocation of the turbine fracturing system follows the principle of load balancing, that is, the displacement of the apparatus with higher load is preferentially reduced.

In one example, the total liquid amount threshold value is 10% to 50% of the total liquid amount preset value, for example, 20%. For example, in the case that the current total liquid amount is smaller than 20% of the total liquid amount preset value, the turbine control system will reduce the total displacement of the turbine fracturing system to prevent the sudden drop of the gas supply system from affecting the operation.

The above embodiments describe the process that the turbine engine automatically switches from gaseous fuel to liquid fuel in the case that the gas supply status of fuel gas changes from sufficiency to insufficiency. In the case that the gas supply status of fuel gas changes from insufficiency to sufficiency, the turbine fracturing system of the embodiment of the present disclosure can also control the turbine engine to automatically switch from liquid fuel back to gaseous fuel.

In another embodiment of the present disclosure, the comparison and determination circuit 121 is further configured to determine whether a turbine engine 100 switched to the liquid fuel is existed, in response to the first fuel gas data being greater than or equal to the first threshold value. In the case that the turbine engine 100 switched to the liquid fuel is existed, the comparison and determination circuit 121 is further configured to determine whether the first fuel gas data is greater than or equal to a second threshold value in response to the turbine engine 100 switched to the liquid fuel being existed, wherein the second threshold value is greater than the first threshold value. The control circuit 122 is further configured to generate a second fuel switching signal for switching the liquid fuel of the turbine engine 100 back to the gaseous fuel in response to the first fuel gas data being greater than or equal to the second threshold value. For example, the second threshold value is approximately equal to the standard pressure or the standard flow rate.

In the above embodiments of the present disclosure, in the case that the gas supply status of fuel gas changes from insufficiency to sufficiency, the turbine fracturing system can control the turbine engine to automatically switch from liquid fuel back to gaseous fuel. It not only ensures the normal operation of the turbine fracturing apparatus but also improves the operation safety of operators and reduces the operation intensity.

For example, the control circuit 122 is further configured to obtain the total number M of the turbine engines 100 having been switched to the liquid fuel, wherein M is a positive integer smaller than N. The control circuit 122 is further configured to select the turbine engine 100 with the shortest operational time among the M turbine engines 100 and generate the second fuel switching signal for switching the liquid fuel of the turbine engine 100 with the shortest operable time back to gaseous fuel.

For example, the turbine engine 100 with the shortest operational time satisfies at least one of the following three conditions: a1) the current liquid amount of liquid fuel stored in the turbine engine 100 is the smallest; B1) the load of the turbine engine 100 is the largest; and c1) the ratio of the current liquid amount of liquid fuel stored in the turbine engine 100 to the load of the turbine engine 100 is the lowest.

In the above process of switching from liquid fuel back to gaseous fuel, the turbine engine 100 with the shortest operational time is selected firstly for switching, which can make the switching process smoother and ensure that other apparatus(es) with higher oil amount-load ratio can work normally. In the case that the gas supply status of the fuel gas continues to be sufficient, other apparatus(es) can be further selected to switch the oil fuel as used, until all the turbine fracturing apparatuses are switched to gaseous fuel.

In one example, the turbine control system determines the gas supply status depending on the gas pressure. In the case that the gas pressure is lower than 95% of the standard pressure, the turbine control system automatically selects the apparatus with the highest oil amount-load ratio for fuel switching, that is, converting the gaseous fuel into liquid fuel. In the case that the gas pressure is higher than 10% of the standard pressure, which means that the current gas supply pressure is sufficient, the turbine fracturing system will select the apparatus with lowest oil amount-load ratio to switch the oil fuel, that is, switching the liquid fuel to gaseous fuel until it is all gaseous fuel.

In another example, the turbine control system determines the gas supply status depending on the gas flow rate. In the case that the gas flow rate is lower than 95% of the standard flow rate, the turbine control system automatically selects the apparatus with the highest oil amount-load ratio for fuel switching, that is, converting gaseous fuel into liquid fuel. In the case that the gas flow rate is equal to or close to the standard flow rate, which means that the current gas supply pressure is sufficient, the turbine fracturing system will select the apparatus with lowest oil amount-load ratio to switch the oil fuel, that is, switching the liquid fuel to gaseous fuel until it is all gaseous fuel.

At least one embodiment of the present disclosure further provides a controlling method of a turbine fracturing system.

Figure 4:
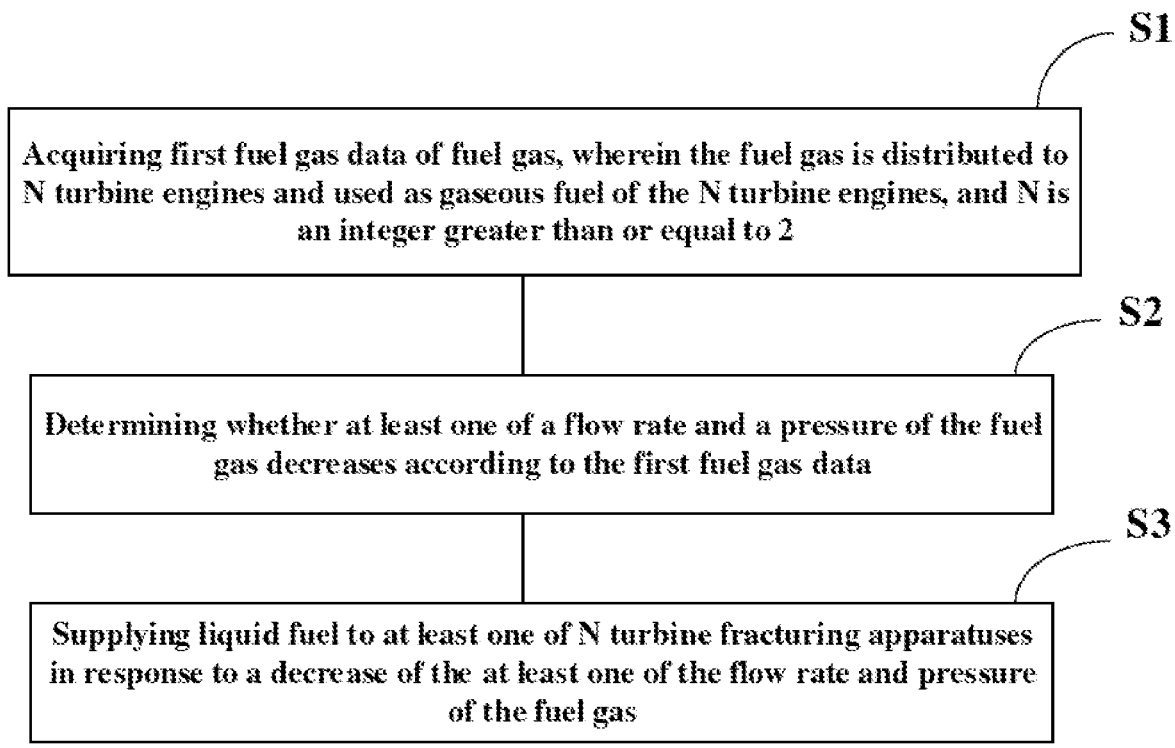
FIG. 4 is a flowchart of a controlling method of a turbine fracturing system provided according to an embodiment of the present disclosure.

FIG. 4 is a flowchart of a controlling method of a turbine fracturing system provided according to an embodiment of the present disclosure. For example, as shown in FIG. 4, the controlling method of the turbine fracturing system includes:

Step S1, acquiring first fuel gas data of fuel gas, wherein the fuel gas is distributed to N turbine engines and used as gaseous fuel of the N turbine engines, and N is an integer greater than or equal to 2;

Step S2, determining whether at least one of a flow rate and a pressure of the fuel gas decreases according to the first fuel gas data; and Step S3, supplying liquid fuel to at least one of N turbine fracturing apparatuses in response to a decrease of the at least one of the flow rate and pressure of the fuel gas.

In the controlling method of the turbine fracturing system provided by the above embodiments, in the case that at least one of the flow rate and pressure of the fuel gas decreases, liquid fuel is supplied to at least one of the N turbine fracturing apparatuses. That is, in the case that the fuel gas supplied by the fuel gas supply apparatus is insufficient, the fuel liquid supply apparatus can be controlled to automatically supply liquid fuel to the turbine engine, so that the normal operation of the N turbine fracturing apparatuses can be ensured and the turbine fracturing system can maintain the normal displacement output. Moreover, because the switching from gaseous fuel to liquid fuel is automatically completed, the operation safety of operators is improved and the labor intensity of manual operation is reduced.

Figure 5:
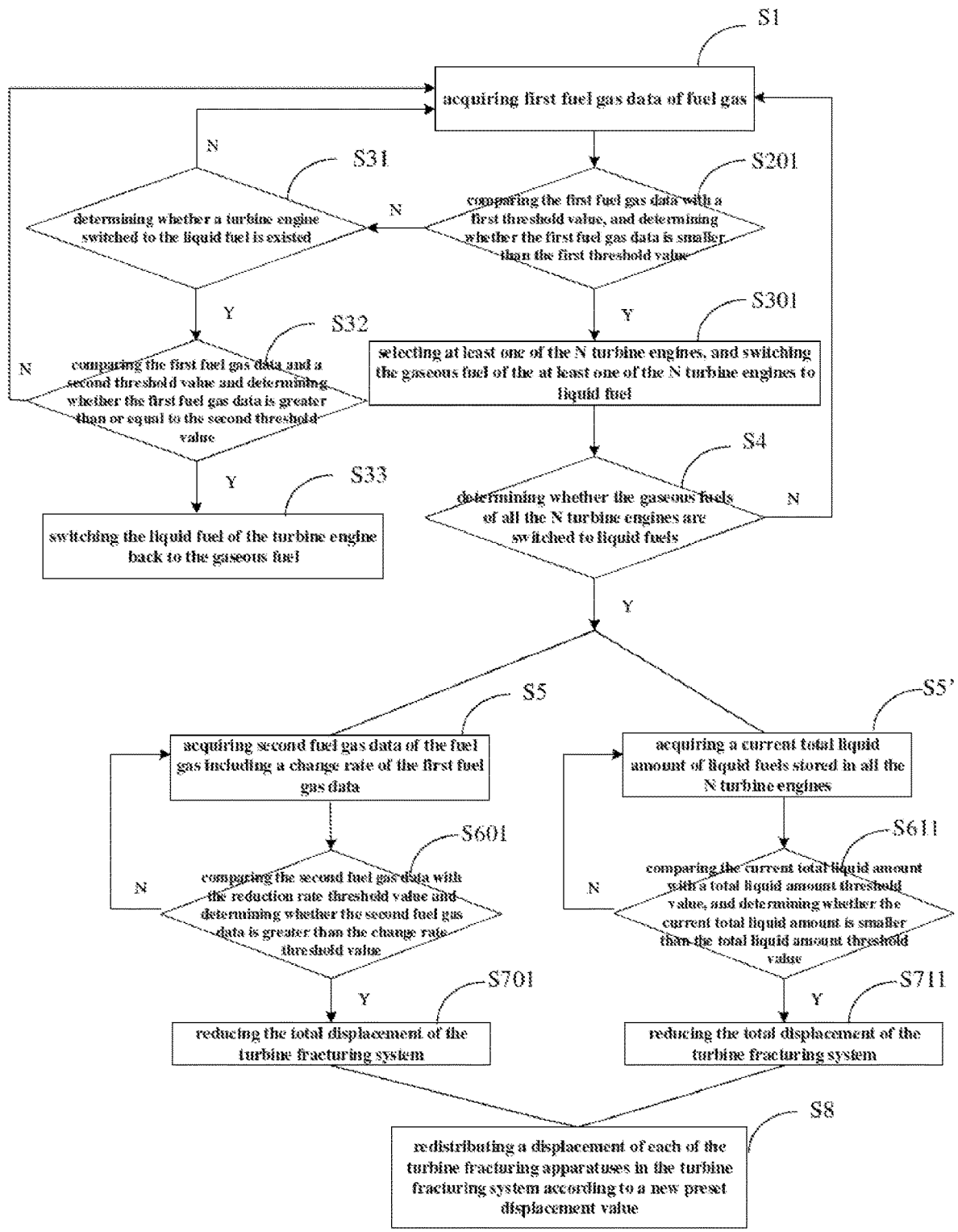
FIG. 5 is a flowchart of a controlling method of a turbine fracturing system provided according to another embodiment of the present disclosure.

FIG. 5 is a flowchart of a controlling method of a turbine fracturing system provided according to another embodiment of the present disclosure. For example, as shown in FIG. 5, the step S2 includes:

Step S201: comparing the first fuel gas data with a first threshold value, and determining whether the first fuel gas data is smaller than the first threshold value.

In this case, for example, the step S3 includes:

Step S301: selecting at least one of the N turbine engines, and switching the gaseous fuel of the at least one of the N turbine engines to liquid fuel, in response to the first fuel gas data being smaller than the first threshold value.

For example, the first fuel gas data includes at least one of pressure and flow rate of the fuel gas, and the first threshold value includes at least one of a first pressure threshold value corresponding to the pressure and a first flow rate threshold value corresponding to the flow rate.

In the embodiment of the present disclosure, the specific definition of the first pressure threshold value and the first flow rate threshold value can refer to the relevant description in the previous embodiment, and will not be repeated here.

Further, for example, step S301 includes:

Step S3011: selecting the turbine engine with the longest operational time among the N turbine engines, and switching the gaseous fuel of the turbine engine with the longest operational time to the liquid fuel. For example, the turbine engine with the longest operational time satisfies at least one of the following three conditions: a) the current liquid amount of liquid fuel stored in the turbine engine is the largest; b) the load of the turbine engine is the smallest; and c) the ratio of the current liquid amount of liquid fuel stored in the turbine engine to the load of the turbine engine is the highest.

As mentioned above, in the case that the gas supply is insufficient and the first fuel gas data drops below the first threshold value, the turbine engine on at least one turbine fracturing apparatus can be selected to switch the fuel from gaseous fuel to liquid fuel. If the fuel gas continues to drop and the drop speed is fast, the normal operation of the turbine fracturing trailer group may not be guaranteed even if the fuel is switched to liquid fuel. At this time, it is possible to adjust the total displacement of the turbine fracturing system 1. The embodiment of the present disclosure also provides two ways of automatically adjusting the displacement, which will be described separately below.

For example, as shown in FIG. 5, the controlling method of the turbine fracturing system further includes:

Step S4, determining whether the gaseous fuels of all the N turbine engines are switched to liquid fuels.

Figure 6:
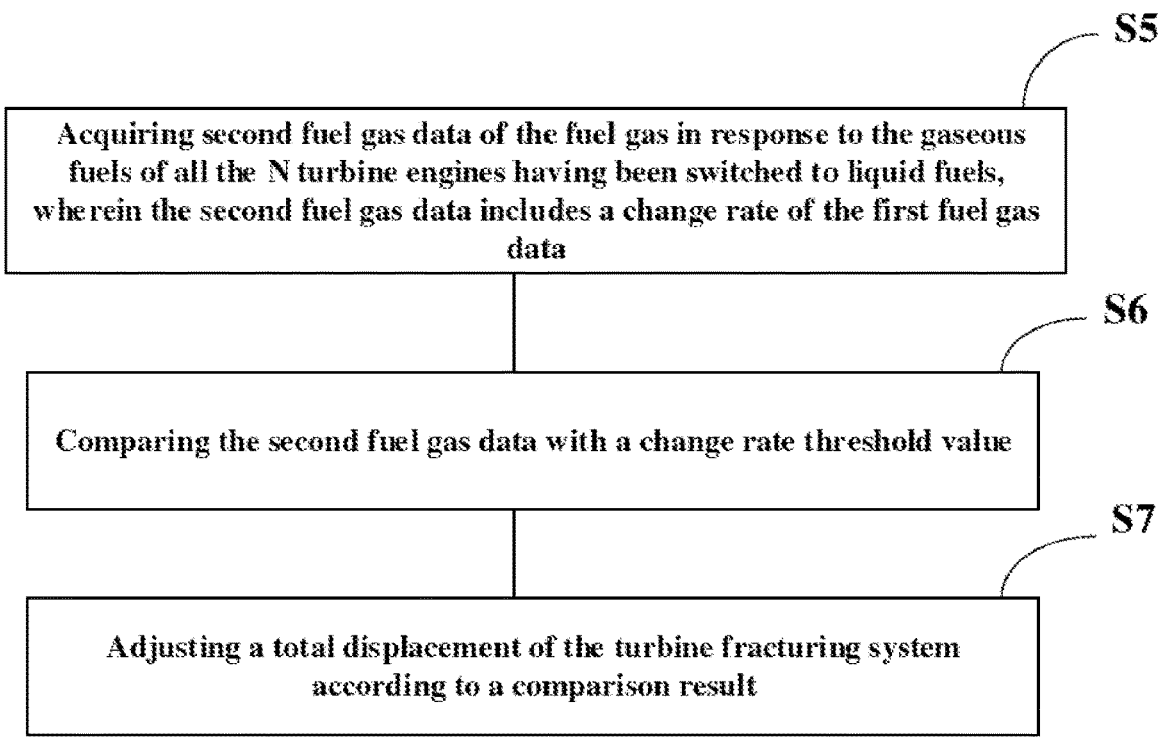
FIG. 6 is a flowchart of a controlling method of a turbine fracturing system provided according to yet another embodiment of the present disclosure.

FIG. 6 is a flowchart of a controlling method of a turbine fracturing system provided according to another embodiment of the present disclosure. For example, as shown in FIG. 6, the controlling method of the turbine fracturing system further includes:

Step S5, acquiring second fuel gas data of the fuel gas in response to the gaseous fuels of all the N turbine engines having been switched to liquid fuels, wherein the second fuel gas data includes a change rate of the first fuel gas data;

Step S6, comparing the second fuel gas data with a change rate threshold value; and Step S7, adjusting a total displacement of the turbine fracturing system according to a comparison result.

For example, the change rate of the first fuel gas data includes a reduction rate of the first fuel gas data, and the change rate threshold value includes a reduction rate threshold value of the first fuel gas data.

In this case, as shown in FIG. 5, the step S6 includes:

Step S601, compare the second fuel gas data with the reduction rate threshold value of the first fuel gas data, and determining whether the second fuel gas data is greater than or equal to the reduction rate threshold value of the first fuel gas data.

In this case, as shown in FIG. 5, the step S7 includes:

Step S701, reducing the total displacement of the turbine fracturing system in response to the second fuel gas data being greater than or equal to the reduction rate threshold value of the first fuel gas data.

In the above embodiments of the present disclosure, the controlling method of the turbine control system can automatically adjust the total displacement of the turbine fracturing system in real time according to the gas supply status of the fuel gas, thereby further ensuring the normal and stable operation of the turbine fracturing trailer group.

Figure 7:
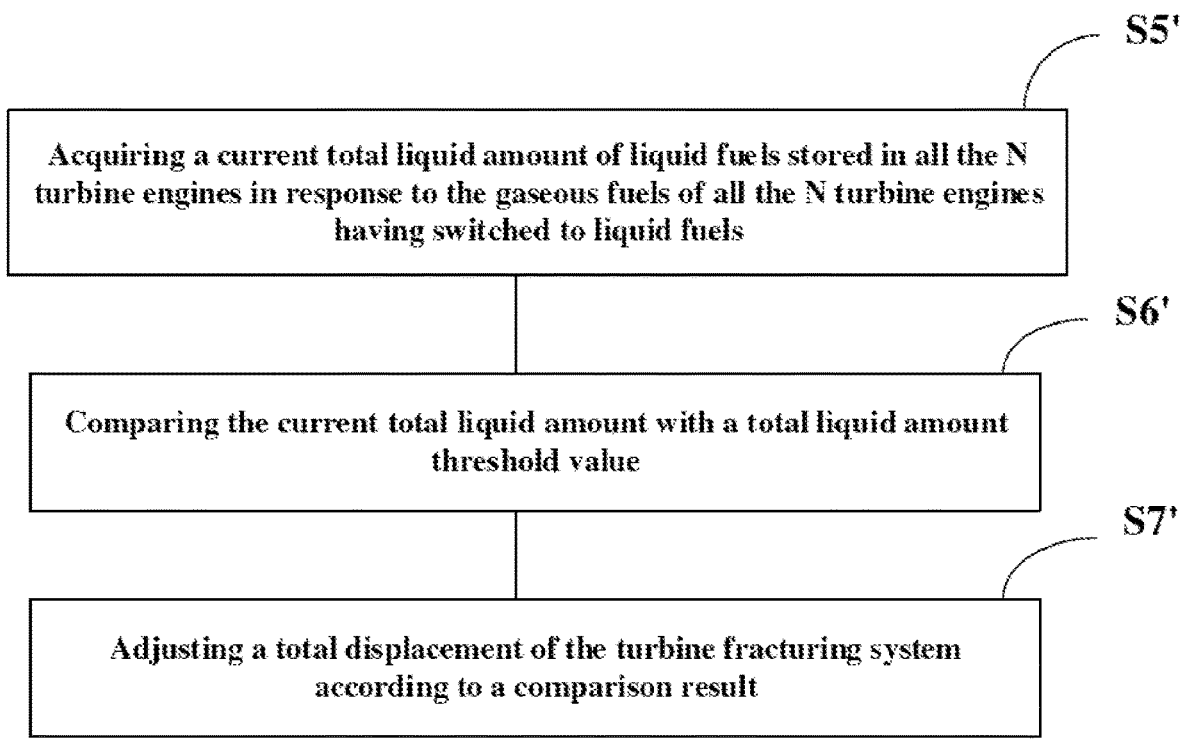
FIG. 7 is a flowchart of a controlling method of a turbine fracturing system provided according to still another embodiment of the present disclosure.

FIG. 7 is a flowchart of a controlling method of a turbine fracturing system provided according to another embodiment of the present disclosure. For example, as shown in FIG. 7, the controlling method of the turbine fracturing system further includes:

Step S5', acquiring a current total liquid amount of liquid fuels stored in all the N turbine engines in response to the gaseous fuels of all the N turbine engines having switched to liquid fuels;

S6', comparing the current total liquid amount with a total liquid amount threshold value; and S7', adjusting a total displacement of the turbine fracturing system according to a comparison result.

In this case, as shown in FIG. 5, the step S6' includes:

Step S611, comparing the current total liquid amount with a total liquid amount threshold value, and determining whether the current total liquid amount is smaller than the total liquid amount threshold value.

In this case, as shown in FIG. 5, the step ST includes:

Step S711, reducing the total displacement of the turbine fracturing system in response to the current total liquid amount being smaller than the total liquid amount threshold value.

In the above embodiments of the present disclosure, the controlling method of the turbine fracturing system can automatically adjust the total displacement of the turbine fracturing system in real time according to the current storage status of the liquid fuel, thereby further ensuring the normal and stable operation of the turbine fracturing trailer group.

In the case that adjusting the total displacement of the turbine fracturing system by adopting any of the above-described ways, for example, as shown in FIG. 5, the controlling method further includes:

Step S8, redistributing a displacement of each of the turbine fracturing apparatuses in the turbine fracturing system according to a new preset displacement value. For the specific allocation mode, reference may be made to the description of the previous embodiments, which will not be repeated here.

The above embodiments describe the process that the turbine engine automatically switches from gaseous fuel to liquid fuel in the case that the gas supply status of the fuel gas changes from sufficiency to insufficiency. In the case that the gas supply status of the fuel gas changes from insufficiency to sufficiency, the turbine fracturing system of the embodiment of the present disclosure can also control the turbine engine to automatically switch from liquid fuel back to gaseous fuel.

For example, as shown in FIG. 5, the controlling method of the turbine fracturing system further includes:

Step S31, determining whether a turbine engine switched to the liquid fuel is existed, in response to the first fuel gas data being greater than or equal to the first threshold value;

Step S32, comparing the first fuel gas data and a second threshold value and determining whether the first fuel gas data is greater than or equal to the second threshold value, in response to the turbine engine switched to the liquid fuel being existed;

Step S33, switching the liquid fuel of the turbine engine back to the gaseous fuel in response to the first fuel gas data being greater than or equal to the second threshold value.

In the above embodiments of the disclosure, in the case that the gas supply status of the fuel gas changes from insufficiency to sufficiency, the controlling method of the turbine fracturing system can control the turbine engine to automatically switch from liquid fuel back to gaseous fuel. It not only ensures the normal operation of the turbine fracturing apparatus, but also improves the operation safety of operators and reduces the operation intensity.

Further, for example, the step S31 further includes:

acquiring the total number M of the turbine engine(s) having been switched to liquid fuel, wherein M is a positive integer smaller than N.

Further, for example, the step S33 includes:

selecting a turbine engine with the shortest operational time among the M turbine engines, and switching the liquid fuel of the turbine engine with the shortest operational time back to gaseous fuel. For example, the turbine engine with the shortest operational time satisfies at least one of the following three conditions: a1) the current liquid amount of liquid fuel stored in the turbine engine is the smallest; b1) the load of the turbine engine is the largest; and c1) the ratio of the current liquid amount of liquid fuel stored in the turbine engine to the load of the turbine engine is the lowest.

In the above process of switching from liquid fuel back to gaseous fuel, the turbine engine 100 with the shortest operational time is selected for switching, which can make the switching process smoother and ensure that other apparatus(es) with higher oil amount-load ratio can work normally. In the case that the gas supply status of fuel gas continues to be sufficient, other apparatus(es) can be selected to switch oil fuel as used until all the turbine fracturing apparatuses are switched to gaseous fuel.

At least one embodiment of the present disclosure further provides a controlling apparatus, including:

a processor; and a memory, wherein a computer-executable code is stored in the memory, and the computer-executable code is configured to execute the controlling method of the turbine fracturing system according to any of the previous embodiments when executed by the processor.

Figure 8:
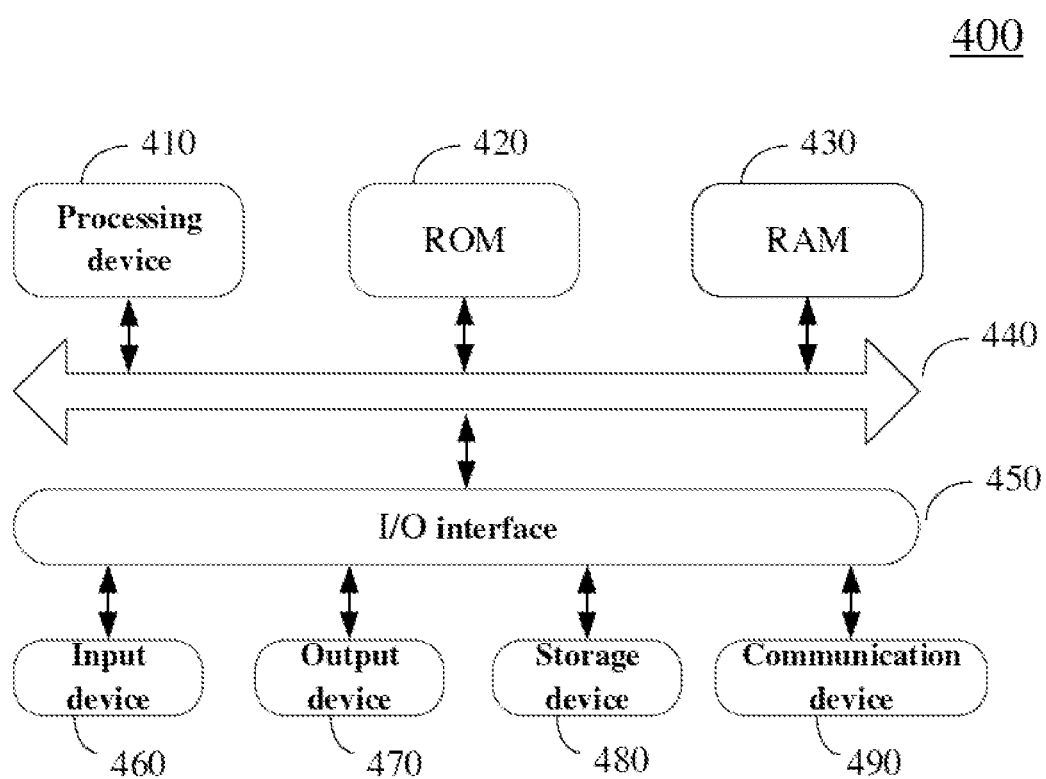
FIG. 8 is a schematic diagram of a controlling apparatus provided according to an embodiment of the present disclosure.

FIG. 8 is a structural diagram of a controlling apparatus provided by at least one embodiment of the present disclosure. For example, the controlling apparatus 400 of the turbine fracturing system shown in FIG. 8 is suitable for implementing the controlling method of the turbine fracturing system provided by the embodiment of the present disclosure. The controlling apparatus 400 of the turbine fracturing system can be a terminal device such as a personal computer, a notebook computer, a tablet computer and a mobile phone, and can also be a workstation, a server, a cloud service and the like. It should be noted that the controlling apparatus 400 of the turbine fracturing system shown in FIG. 8 is merely illustrative, and is not intended to impact any limitation on the function(s) and application scope of the embodiments of the present disclosure.

As shown in FIG. 8, the controlling apparatus 400 of the turbine fracturing system may include a processing device (e.g., a central processor, a graphics processor, etc.) 410, which may execute various appropriate actions and processes according to a program stored in a read only memory (ROM) 420 or a program loaded from a storage device 480 into a random access memory (RAM) 430. In the RAM 430, various programs and data required for the operation of the controlling apparatus 400 of the turbine fracturing system are also stored. The processing device 410, the ROM 420, and the RAM 430 are connected to each other through a bus 440. An input/output (I/O) interface 450 is also connected to the bus 440.

Generally, the following devices can be connected to the I/O interface 450: an input device 460 including, for example, a touch screen, a touch pad, a keyboard, a mouse, a camera, a microphone, an accelerometer, a gyroscope, and the like; an output device 470 including, for example, a liquid crystal display (LCD), a speaker, a vibrator and the like; a storage device 480 including, for example, a magnetic tape, a hard disk and the like; and a communication device 490. The communication device 490 may allow the controlling apparatus 400 of the turbine fracturing system to communicate with other electronic devices in a wired or wireless manner, to exchange data. Although FIG. 8 shows a controlling apparatus 400 of the turbine fracturing system including various devices, it should be understood that it is not required to implement or have all the illustrated devices, and the controlling apparatus 400 of the turbine fracturing system may alternatively implement or have more or fewer devices.

For example, according to an embodiment of the present disclosure, the controlling method of the above-described turbine fracturing system can be implemented as a computer software program. For example, an embodiment of the present disclosure includes a computer program product including a computer program carried on a non-transient computer-readable medium, and the computer program includes program codes for executing the above-described controlling method of the turbine fracturing system. In such an embodiment, the computer program can be downloaded and installed from the network through the communication device 490, or installed from the storage device 480, or installed from the ROM 420. When the computer program is executed by the processing device 410, the functions defined in the controlling method of the turbine fracturing system provided by the embodiment of the present disclosure can be executed.

At least one embodiment of the present disclosure also provides a computer-readable storage medium on which a computer executable code is stored, when executed by a processor, the computer executable code causes the processor to execute the controlling method of the turbine fracturing system described in any of the previous embodiments.

Figure 9:
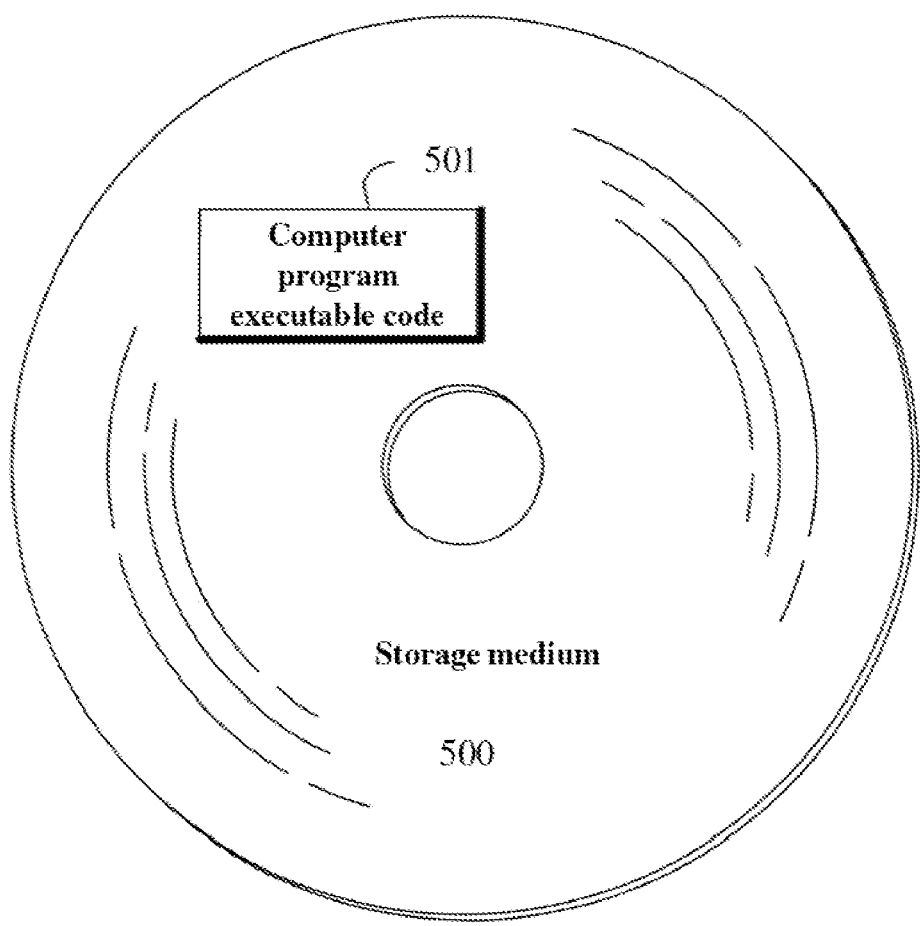
FIG. 9 is a schematic diagram of a storage medium provided according to an embodiment of the present disclosure.

FIG. 9 is a schematic diagram of a storage medium provided according to an embodiment of the present disclosure. As shown in FIG. 9, a storage medium 500 stores a computer program executable code 501 non-temporarily. For example, when the computer program executable code 501 is executed by a computer, one or more steps in the controlling method of the turbine fracturing system according to the above can be executed.

For example, the storage medium 500 can be applied to the controlling apparatus 400 of the above-mentioned turbine fracturing system. For example, the storage medium 500 may be the memory 420 in the controlling apparatus 400 of the turbine fracturing system shown in FIG. 8. For example, the relevant description of the storage medium 500 can refer to the corresponding description of the memory 420 in the controlling apparatus 400 of the turbine fracturing system shown in FIG. 8, and will not be repeated here.

In the above embodiments of the present disclosure, the turbine fracturing system and the controlling method thereof, the controlling apparatus and the computer-readable storage medium have at least the following technical effects: 1) the fuel can be automatically switched by monitoring the gas supply status of the fuel gas, thus reducing the labor intensity of manual operation and ensuring operation safety; 2) the displacement of the turbine fracturing system can be adjusted more quickly, with low cost and high safety; 3) an automatic operation can be realized, and the problem of shutting down the entire trailer group caused by untimely switching can be avoided.

In the present disclosure, the following should be noted:
(1) The accompanying drawings involve only the structure(s) in connection with the embodiment(s) of the present disclosure, and other structure(s) can be referred to common design(s).
(2) In case of no conflict, features in one embodiment or in different embodiments can be combined as a new embodiment.

What is described above is related to the exemplary embodiments of the disclosure only, but the protection scope of the present disclosure is not limited to this. Any ordinary person skilled in the art can easily construct changes or substitutions within the technical scope disclosed in the present disclosure, and these changes or substitutions shall be encompassed by the protection scope of this disclosure. Accordingly, the protection scope of the disclosure should be defined by the accompanying claims.

What is claimed is:

1. A turbine fracturing system, comprising:
N turbine fracturing apparatuses, wherein each of the N turbine fracturing apparatuses comprises a turbine engine, and N is an integer greater than or equal to 2;
a fuel gas supply apparatus connected to the N turbine engines, wherein the fuel gas supply apparatus is configured to supply gaseous fuel and distribute the gaseous fuel to the N turbine engines; and
a fuel liquid supply apparatus connected to the N turbine engines and configured to supply liquid fuel in place of the gaseous fuel to at least one turbine engine selected from the N turbine engines for the selected at least one turbine engine to switch from the gaseous fuel to the liquid fuel when at least one of a collective flow rate and a collective pressure of the gaseous fuel supplied to the N turbine engines satisfies a predetermined condition.

2. The turbine fracturing system according to claim 1, further comprising a measurement and control apparatus, the measurement and control apparatus comprising a data acquisition device and a data processing device, wherein:
the data acquisition device is in signal communication with the fuel gas supply apparatus, and configured to acquire first gaseous fuel data of the gaseous fuel and send the first gaseous fuel data to the data processing device; and
the data processing device comprises:
a comparison and determination circuit in signal communication with the data acquisition device for determining whether the predetermined condition is satisfied in that the comparison and determination circuit is configured to compare the first gaseous fuel data with a first threshold value and determine whether the first gaseous fuel data is smaller than the first threshold value, wherein the first gaseous fuel data comprises the at least one of the collective pressure and the collective flow rate of the gaseous fuel, and the first threshold value comprises at least one of a first pressure threshold value corresponding to the collective pressure and a first flow rate threshold value corresponding to the collective flow rate; and
a control circuit in signal communication with the comparison and determination circuit, and configured to select the at least one turbine engine from the N turbine engines and generate a first fuel switching signal in response to the first gaseous fuel data being smaller than the first threshold value, wherein the first fuel switching signal is used for switching the gaseous fuel of the at least one turbine engine into liquid fuel.

3. The turbine fracturing system according to claim 2, wherein:
the turbine fracturing system further comprises a liquid fuel storage device for and connected with each turbine engine, and the fuel liquid supply apparatus supplies the liquid fuel to the at least one turbine engine through the liquid fuel storage device;
each of the N turbine fracturing apparatuses further comprises a local control device in signal communication with the turbine engine;
the control circuit is further configured to send the first fuel switching signal to the local control device corresponding to the at least one turbine engines as selected;
the local control device is configured to switch the gaseous fuel of the at least one turbine engine as selected to the liquid fuel according to the first fuel switching signal; and
the liquid fuel is supplied by the fuel liquid storage device connected to the at least one turbine engine as selected.

4. The turbine fracturing system according to claim 3, wherein:
the turbine fracturing system further comprises a gaseous fuel delivery device connected with each of the N turbine engines, and the fuel gas supply apparatus supplies the gaseous fuel to each of the N turbine engines through the gaseous fuel delivery device;
the local control device of each of the N turbine engines comprises a local control circuit and a switching circuit;
the local control circuit is configured to receive the first fuel switching signal and control the switching circuit to switch from the gaseous fuel to the liquid fuel;
the switching circuit is connected to the liquid fuel storage device and the gaseous fuel delivery device which are arranged on a same turbine fracturing apparatus, and is configured to switch from the gaseous fuel delivery device to the liquid fuel storage device.

5. The turbine fracturing system according to claim 2, wherein:
each of the at least one turbine engine of the N turbine engines is selected due to their longest operational times, wherein a turbine engine with the longest operational time satisfies at least one of the following three conditions:
a current amount of liquid fuel stored for the turbine engine is the largest;
a load of the turbine engine is the smallest; and
a ratio of the current amount of liquid fuel stored for the turbine engine to the load of the turbine engine is the highest.

6. The turbine fracturing system according to claim 2, wherein:
the data acquisition device is further configured to acquire second gaseous fuel data of the gaseous fuel and send the second gaseous fuel data to the data processing device, and the second gaseous fuel data comprises a change rate of the first gaseous fuel data;
the comparison and determination circuit is further configured to compare the second gaseous fuel data with a change rate threshold value and send a comparison result to the control circuit; and
the control circuit is further configured to adjust a total displacement of the turbine fracturing system according to the comparison result.

7. The turbine fracturing system according to claim 6, wherein:
the change rate of the first gaseous fuel data comprises a reduction rate of the first gaseous fuel data, and the change rate threshold value comprises a reduction rate threshold value of the first gaseous fuel data;
the comparison and determination circuit is further configured to compare the second gaseous fuel data with the reduction rate threshold value of the first gaseous fuel data and determine whether the second gaseous fuel data is greater than or equal to the reduction rate threshold value of the first gaseous fuel data; and
the control circuit is further configured to generate a first displacement reduction signal for reducing the total displacement of the turbine fracturing system in response to the second gaseous fuel data being greater than or equal to the reduction rate threshold value of the first gaseous fuel data.

8. The turbine fracturing system according to claim 2, wherein:
the fuel liquid supply apparatus comprises N liquid fuel storage devices arranged on the N turbine fracturing apparatuses in one-to-one correspondence and connected with the N turbine engines in one-to-one correspondence;
the data acquisition device is further configured to acquire a current total amount of the liquid fuel stored in all the N liquid fuel storage devices and send the current total amount of liquid fuel to the data processing device;
the comparison and determination circuit is further configured to compare the current total amount of liquid fuel with a total amount threshold value and determine whether the current total amount of liquid fuel is smaller than the total amount threshold value; and
the control circuit is further configured to generate a second displacement reduction signal for reducing a total displacement of the turbine fracturing system in response to the current total amount of liquid fuel being smaller than the total amount threshold value.

9. The turbine fracturing system according to claim 2, wherein:
the comparison and determination circuit is further configured for:
determining whether a turbine engine of the N turbine engines having switched to the liquid fuel exists in response to the first gaseous fuel data being greater than or equal to the first threshold value; and
comparing the first gaseous fuel data and a second threshold value and determining whether the first gaseous fuel data is greater than or equal to the second threshold value in response to the turbine engine having switched to the liquid fuel being in existence, wherein the second threshold value is greater than the first threshold value; and
the control circuit is further configured to generate a second fuel switching signal for switching the liquid fuel of the turbine engine having switched to the liquid fuel back to the gaseous fuel in response to the first gaseous fuel data being greater than or equal to the second threshold value.

10. The turbine fracturing system according to claim 9, wherein:
the control circuit is further configured to acquire a total number M of the N turbine engines having switched to the liquid fuel, wherein M is a positive integer smaller than N;
the control circuit is further configured to select a turbine engine with the shortest operational time among M turbine engines and generate the second fuel switching signal for switching the liquid fuel of the turbine engine with the shortest operational time back to the gaseous fuel; and
the turbine engine with the shortest operational time satisfies at least one of the following three conditions:
a current amount of liquid fuel stored for the turbine engine is the smallest;
a load of the turbine engine is the largest; and
a ratio of the current amount of liquid fuel stored for the turbine engine to the load of the turbine engine is the lowest.

11. A controlling method of a turbine fracturing system, comprising:
acquiring first gaseous fuel data of gaseous fuel, wherein the gaseous fuel is distributed to N turbine engines, and N is an integer greater than or equal to 2;
determining whether at least one of a collective flow rate and a collective pressure of the gaseous fuel supplied to the N turbine engines satisfies a predetermined condition according to the first gaseous fuel data of gaseous fuel supplied to the N turbine engines satisfies a predetermined condition; and
supplying liquid fuel to at least one turbine engine selected form the N turbine engines for the selected at least one turbine engine to switch from the gaseous fuel to the liquid fuel in response to the predetermined condition being satisfied.

12. The controlling method of the turbine fracturing system according to claim 11, wherein determining whether the at least one of the collective flow rate and the collective pressure of the a predetermined condition satisfied the predetermined condition comprises:
comparing the first gaseous fuel data with a first threshold value, and determining whether the first gaseous fuel data is smaller than the first threshold value, wherein the first gaseous fuel data comprises the at least one of the collective pressure and the collective flow rate, and the first threshold value comprises at least one of a first pressure threshold value corresponding to the collective pressure and a first flow rate threshold value corresponding to the collective flow rate,
wherein supplying the liquid fuel to the at least one turbine engine selected from the N turbine engines in response to the predetermined condition being satisfied comprises selecting the at least one turbine engine from the N turbine engines and switching the gaseous fuel of the at least one turbine engine to the liquid fuel in response to the first gaseous fuel data being smaller than the first threshold value.

13. The controlling method of the turbine fracturing system according to claim 12,
wherein selecting the at least one turbine engine from the N turbine engines and switching the gaseous fuel of the at least one turbine engine to the liquid fuel in response to the first gaseous fuel data being smaller than the first threshold value comprises selecting a turbine engine with the longest operational time among the N turbine engines, and switching the gaseous fuel of the selected turbine engine with the longest operational time to the liquid fuel,
wherein the turbine engine with the longest operational time satisfies at least one of the following three conditions:
a current amount of liquid fuel stored for the turbine engine is the largest;
a load of the turbine engine is the smallest; and
a ratio of the current amount of liquid fuel stored for the turbine engine to the load of the turbine engine is the highest.

14. The controlling method of the turbine fracturing system according to claim 11, further comprising determining whether the gaseous fuel of all the N turbine engines are switched to liquid fuel.

15. The controlling method of the turbine fracturing system according to claim 14, further comprising:
acquiring second gaseous fuel data of the gaseous fuel in response to the gaseous fuel of all the N turbine engines being switched to liquid fuel, wherein the second gaseous fuel data comprises a change rate of the first gaseous fuel data;
comparing the second gaseous fuel data with a change rate threshold value; and adjusting a total displacement of the turbine fracturing system according to a comparison result.

16. The controlling method of the turbine fracturing system according to claim 15,
wherein the change rate of the first gaseous fuel data comprises a reduction rate of the first gaseous fuel data, and the change rate threshold value comprises a reduction rate threshold value of the first gaseous fuel data;
wherein comparing the second gaseous fuel data with the change rate threshold value comprises comparing the second gaseous fuel data with the reduction rate threshold value of the first gaseous fuel data, and determining whether the second gaseous fuel data is greater than or equal to the reduction rate threshold value of the first gaseous fuel data; and
wherein adjusting the total displacement of the turbine fracturing system according to the comparison result comprises reducing the total displacement of the turbine fracturing system in response to the second gaseous fuel data being greater than or equal to the reduction rate threshold value of the first gaseous fuel data.

17. The controlling method of the turbine fracturing system according to claim 14, further comprising:
acquiring a current total amount of liquid fuel stored for all the N turbine engines in response to the gaseous fuel of all the N turbine engines being switched to the liquid fuel;
comparing the current total amount of liquid fuel with a total amount threshold value; and
adjusting a total displacement of the turbine fracturing system according to a comparison result.

18. The controlling method of the turbine fracturing system according to claim 12, further comprising:
determining whether a turbine engine having switched to the liquid fuel exists in response to the first gaseous fuel data being greater than or equal to the first threshold value;
comparing the first gaseous fuel data and a second threshold value and determining whether the first gaseous fuel data is greater than or equal to the second threshold value in response to the turbine engine having switched to the liquid fuel being in existence, wherein the second threshold value is greater than the first threshold value; and
switching the liquid fuel of the turbine engine having switched to the liquid fuel back to the gaseous fuel in response to the first gaseous fuel data being greater than or equal to the second threshold value.

19. A controlling apparatus, comprising:
a processor; and
a memory for storing computer-executable code, the computer-executable code being execute by the processor to control the turbine fracturing system of claim 11 according to the method of claim 11.

20. A computer-readable non-transitory storage medium for storing computer-executable code, wherein the computer-executable code, when executed by a processor, causes the processor to perform the controlling method of the turbine fracturing system according to claim 11.

* * * * *